United States Patent
Liu et al.

(10) Patent No.: US 10,949,095 B2
(45) Date of Patent: Mar. 16, 2021

(54) METHOD, NETWORK ADAPTERS AND COMPUTER PROGRAM PRODUCT USING NETWORK ADAPTER MEMORY TO SERVICE DATA REQUESTS

(71) Applicant: EMC IP Holding Company LLC, Hopkinton, MA (US)

(72) Inventors: Fucai Liu, Beijing (CN); Fei Chen, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/539,568

(22) Filed: Aug. 13, 2019

(65) Prior Publication Data

US 2020/0341653 A1    Oct. 29, 2020

(30) Foreign Application Priority Data

Apr. 28, 2019    (CN) .......................... 201910351784.5

(51) Int. Cl.
*G06F 3/06* (2006.01)
*G06F 13/28* (2006.01)

(52) U.S. Cl.
CPC .......... *G06F 3/0611* (2013.01); *G06F 3/0656* (2013.01); *G06F 3/0659* (2013.01); *G06F 3/0673* (2013.01); *G06F 13/28* (2013.01)

(58) Field of Classification Search
CPC ............................ G06F 3/0656; G06F 3/0673
USPC ....................................................... 711/165
See application file for complete search history.

(56) References Cited

U.S. PATENT DOCUMENTS

| 2015/0347349 A1* | 12/2015 | Raindel | G06F 13/28 710/308 |
| 2017/0185512 A1* | 6/2017 | Small | G06F 12/0246 |
| 2019/0278701 A1* | 9/2019 | Enz | G06F 3/0631 |

OTHER PUBLICATIONS

Wikipedia Contributors, "NVM Express," Wikipedia, The Free Encyclopedia, https://en.wikipedia.org/w/index.php?title=NVM_Express&oldid=909854943, accessed Aug. 13, 2019, 10 pages.
Wikipedia Contributors, "PCI Express," Wikipedia, The Free Encyclopedia, https://en.wikipedia.org/w/index.php?title=PCI_Express&oldid=910433483, accessed Aug. 13, 2019, 23 pages.

* cited by examiner

*Primary Examiner* — Than Nguyen
(74) *Attorney, Agent, or Firm* — Ryan, Mason & Lewis, LLP (57) ABSTRACT

A method comprises, at a network adapter of a first device, detecting a write request for storing data in a storage device of the first device, and the write request comprises a first indication for a first storage address of the data in the storage device. The method also comprises, in response to detecting the write request, storing the data at a second storage address in a memory of the network adapter. The method further comprises, storing the first indication in association with a second indication for the second storage address in the memory to enable the storage device to obtain the data. With the above method, by processing and storing data via the controller and the memory of the network adapter, not only a waste of the processor and the memory of the first device is reduced, but also latency of processing commands is decreased.

20 Claims, 5 Drawing Sheets

METHOD, NETWORK ADAPTERS AND COMPUTER PROGRAM PRODUCT USING NETWORK ADAPTER MEMORY TO SERVICE DATA REQUESTS

RELATED APPLICATION(S)

The present application claims priority to Chinese Patent Application No. 201910351784.5, filed Apr. 28, 2019, and entitled "Method, Network Adapter and Computer Program Product for Processing Data," which is incorporated by reference herein in its entirety.

FIELD

Embodiments of the present disclosure generally relate to the field of data processing, and more specifically, to a method, a network adapter and a computer program product for processing data.

BACKGROUND

With the development of network technologies, data exchanges between different network devices occur more frequently. Moreover, since more and more data are stored in a data center, users typically obtain data by accessing service equipment of the data center using computing devices.

Due to the rapid development of hardware of computing devices, the computing devices are used more frequently to exchange data with other devices. Through various protocols in a network, a computing device can communicate, in a certain format, with other computing devices. However, there are still various types of technical problems to be tackled for data transmission with the computing devices.

SUMMARY

Embodiments of the present disclosure provide a method, a network adapter and a computer program product for processing data.

In accordance with a first aspect of the present disclosure, there is provided a method for writing data. The method comprises, at a network adapter of a first device, detecting a write request for storing data in a storage device of the first device, the write request comprising a first indication for a first storage address of the data in the storage device. The method also comprises, in response to detecting the write request, storing the data at a second storage address in a memory of the network adapter. The method further comprises, storing the first indication in association with a second indication for the second storage address in the memory to enable the storage device to obtain the data.

In accordance with a second aspect of the present disclosure, there is provided a method of reading data. The method comprises, at a network adapter of a first device, detecting a read request for reading data from a storage device of the first device, the read request comprising a first indication for a first storage address of the data in the storage device. The method also comprises, in response to detecting the read request, determining a second storage address in a memory of the network adapter, available for storing the data. The method further comprises storing the first indication in association with a second indication for the second storage address in the memory to enable the storage device to store the data into the memory. In addition, the method comprises sending the data stored in the memory as a response to the read request.

In a third aspect of the present disclosure, there is provided a network adapter. The network adapter comprises: a processor; and a memory coupled to the processor and having instructions stored thereon which, when executed by the processor, causing the network adapter to perform acts comprising: detecting a write request for storing data in a storage device of a first device, the write request comprising a first indication for a first storage address of the data in the storage device; in response to detecting the write request, storing the data at a second storage address in the memory of the network adapter; and storing the first indication in association with a second indication for the second storage address in the memory to enable the storage device to obtain the data.

In a fourth aspect of the present disclosure, there is provided a network adapter. The network adapter comprises: a processor; and a memory coupled to the processor and having instructions stored thereon which, when executed by the processor, causing the network adapter to perform acts comprising: detecting a read request for reading data from a storage device of a first device, the read request comprising a first indication for a first storage address of the data in the storage device; in response to detecting the read request, determining a second storage address in the memory of the network adapter, available for storing the data; storing the first indication in association with a second indication for the second storage address in the memory to enable the storage device to store the data into the memory; and sending the data stored in the memory as a response to the read request.

In accordance with a fifth aspect of the present disclosure, there is provided a computer program product is tangibly stored on a nonvolatile computer readable medium and includes machine executable instructions which, when executed, cause a machine to perform steps of the method in the first aspect of the present disclosure.

In accordance with a sixth aspect of the present disclosure, there is provided a computer program product, which is tangibly stored on a nonvolatile computer readable medium and includes machine executable instructions which, when executed, cause a machine to perform steps of the method in the second aspect of the present disclosure.

BRIEF DESCRIPTION OF THE DRAWINGS

Through the following detailed description on the example embodiments of the present disclosure with reference to the accompanying drawings, the above and other objectives, features, and advantages of the present disclosure will become more apparent, in which the same reference symbols refer to the same components.

DETAILED DESCRIPTION

The embodiments disclosed herein will now be described with reference to the accompanying drawings. Although the drawings illustrate some embodiments of the present disclosure, it would be appreciated that the present disclosure can be implemented in various forms but cannot be construed as being limited by the embodiments described herein. Rather, these embodiments are provided to disclose the present disclosure more thoroughly and completely. It would be appreciated that the drawings and embodiments of the present disclosure are only provided as examples, but not used to limit the protection scope of the present disclosure.

As used herein, the term "includes" and its variants are to be read as open-ended terms that mean "includes, but is not limited to." The term "based on" is to be read as "based at least in part on." The term "one embodiment" or "the embodiment" is to be read as "at least one embodiment." The terms "first," "second," and the like may refer to different or same objects. Other definitions, explicit and implicit, may be included below.

Principles of the present disclosure will be described below with reference to several example embodiments as shown in the drawings. Although the drawings illustrate preferred embodiments described herein, these embodiments are described only to enable those skilled in the art to better understand and further implement the present disclosure, but are not used to limit the protection scope of the present disclosure in any manner.

When data are written into or read from a computing device via a network protocol, a network adapter is typically employed to transmit a write command or a read command to a processor of the computing device. The processor of the computing device is provided for processing the received write commands or read commands, and then writing or reading, via a memory of the computing device, data into or from the storage device of the computing device. For example, the computing device may send commands to the computing device with a structural non-volatile memory host controller interface specification NVMe (NVMf), where NVMf is a manner of transmitting NVMe commands via a network protocol. The commands transmitted via NVMf are processed by the processor of the computing device, and data related to the commands is stored temporarily using the memory of the computing device.

However, processing, using a processor and a memory of a computing device, commands received from other devices causes increased latency for command processing and brings about a waste of the processor and the memory of the computing device. In addition, since peripheral component interconnect standard extend (PCIe) exchanger is required to transmit the commands to the processor and store the same to the memory of the device, this also wastes upstream bandwidth of the PCIe exchanger.

In order to solve the above problem, the present disclosure provides a method of processing data. In the method, a processor of a network adapter is used to detect a read command or a write command. In the method, a memory of the network adapter is also provided therein with a buffer area for storing data to be written or read. Then, by transmitting indications to a storage device, the storage device is caused to read data from the memory or write data to the memory. By transferring the commands processed by the processor of the computing device and the data stored in the memory of the computing device to the network adapter, a waste of the processor and the memory of the computing device are reduced and the latency for command processing is decreased. Since a network adapter and a storage device exchange data via a downstream port of a PCIe exchanger, thus reducing a waste of the upstream bandwidth of the PCIe exchanger.

Figure 1:
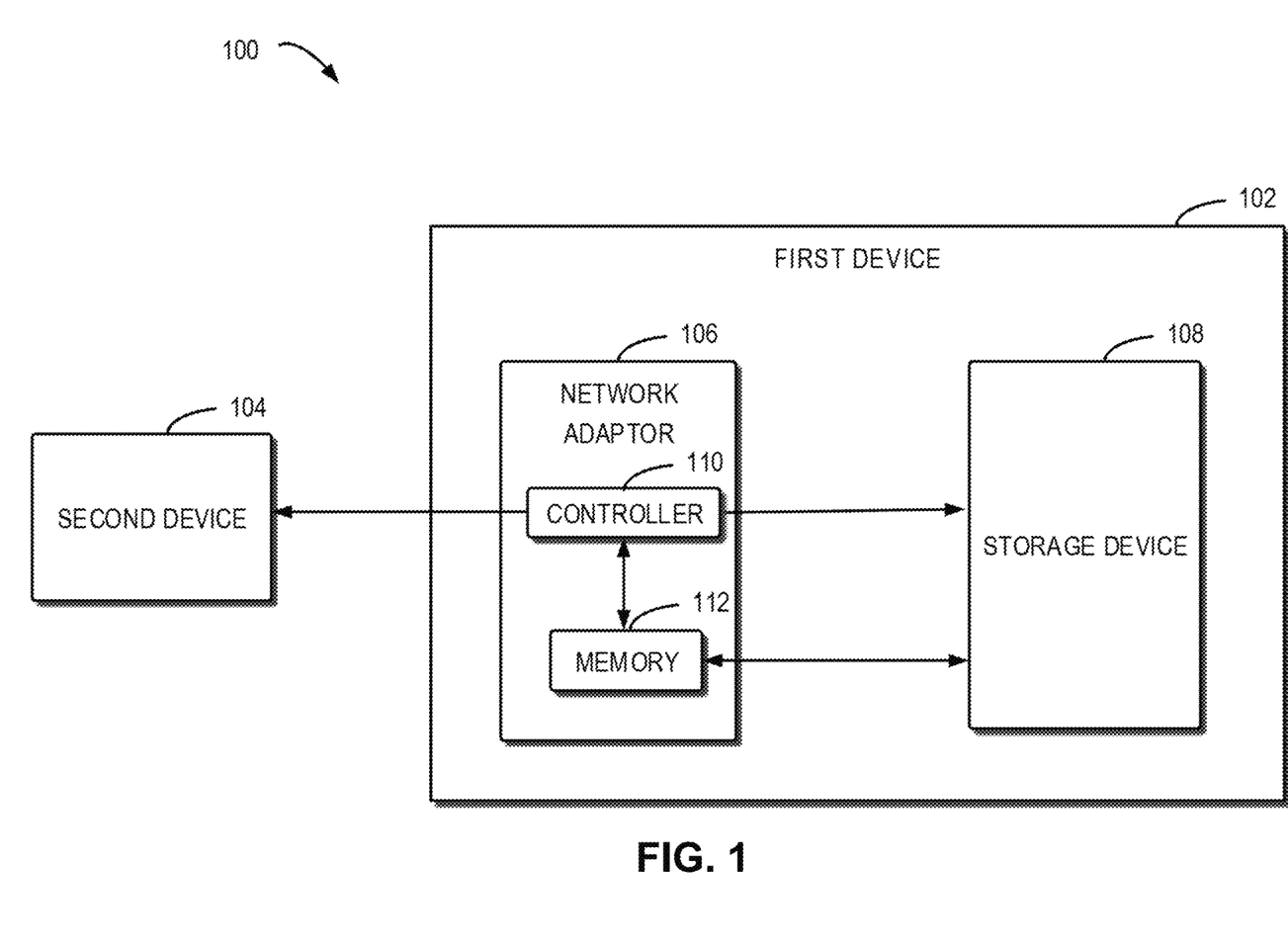
FIG. 1 illustrates a schematic diagram of an example environment in which a device and/or method can be implemented according to an embodiment of the present disclosure.

FIG. 1 illustrates a schematic diagram of an example environment 100 in which a device and/or method can be implemented according to an embodiment of the present disclosure.

The example environment 100 includes a first device 102 and a second device 104. The first device 102 and the second device 104 are computing devices for storing data. The computing device includes, but is not limited to, a personal computer, a server computer, a handheld or laptop device, a mobile device (such as, a mobile phone, a personal digital assistant (PDA), a media player, and the like), a multi-processor system, a consumer electronic product, a small-scale computer, a large-scale computer, and the like.

The first device 102 receives a write request from the second device 104 in the network. The write request is provided for writing data related to a write request from the second device 104 into the first device 102. In some embodiments, the write request includes a storage address where data are to be written into, for example, an address in a storage device 108 of the first device 102. Alternatively or additionally, the write request further includes a length of data to be written. Alternatively or additionally, the write request also includes a storage address in the second device 104. The above example is provided only for describing the present disclosure, rather than specifically limiting the scope of the present disclosure. The write request may include therein any appropriate information according to needs.

The first device 102 includes a network adapter 106 and a storage device 108. The network adapter 106 includes a controller 110 and a memory 112. The controller 110 in the network adapter 106 may process commands from other components outside or inside the first device 102. The network adapter 106 further includes a memory 112 which can store data received by the network adapter 106 from other devices in the network or data to be sent by the network adapter 106 to other devices in the network.

In some embodiments, the controller 110 may include a single core processor or multi-core processor. In some embodiments, the controller 110 may include a field-programmable gate array (FPGA). In some embodiments, the controller 110 may include a complex programmable logic device (CPLD), an application-specific integrated circuit (ASIC), a system-on-a-chip system (SOC), or a combination thereof. The above example is provided only for describing the present disclosure, rather than specifically limiting the scope of the present disclosure. The controller 110 in the network adapter 106 may be implemented by any appropriate component.

The storage device 108 is a storage apparatus for storing data. In some embodiments, the storage device 108 is a solid-state drive (SSD). Alternatively or additionally, the solid-state drive is a solid-state drive SSD with non-volatile memory host controller interface specification NVMe. In some embodiments, the storage device 108 includes a control component for performing a direct memory access (DMA) operation on the network adapter 106. The above example is provided only for providing the present disclosure, rather than specifically limiting the scope of the present disclosure.

In some embodiments, the network adapter 106 and the storage device 108 support point-to-point communication. Alternatively or additionally, the network adapter 106 and the storage device 108 support point-to-point communication of peripheral component interconnect standard extend PCIe. Alternatively or additionally, both the network adapter 106 and the storage device 108 are connected to the PCIe exchanger in the first device 102. In some embodiments, the network adapter 106 also supports the PCIe exchanger in the first device 102. In some embodiments, the network adapter 106 also supports NVMe in fabric to communicate with other devices in the network. For example, the fabric may be RDMA, an optical channel, or the like.

The schematic diagram of an example environment 100 in which a device and/or method is implemented according to an embodiment of the present disclosure has been described above with reference to FIG. 1. A flowchart of a method 200 of writing data will be detailed now with reference to FIG. 2.

Figure 2:
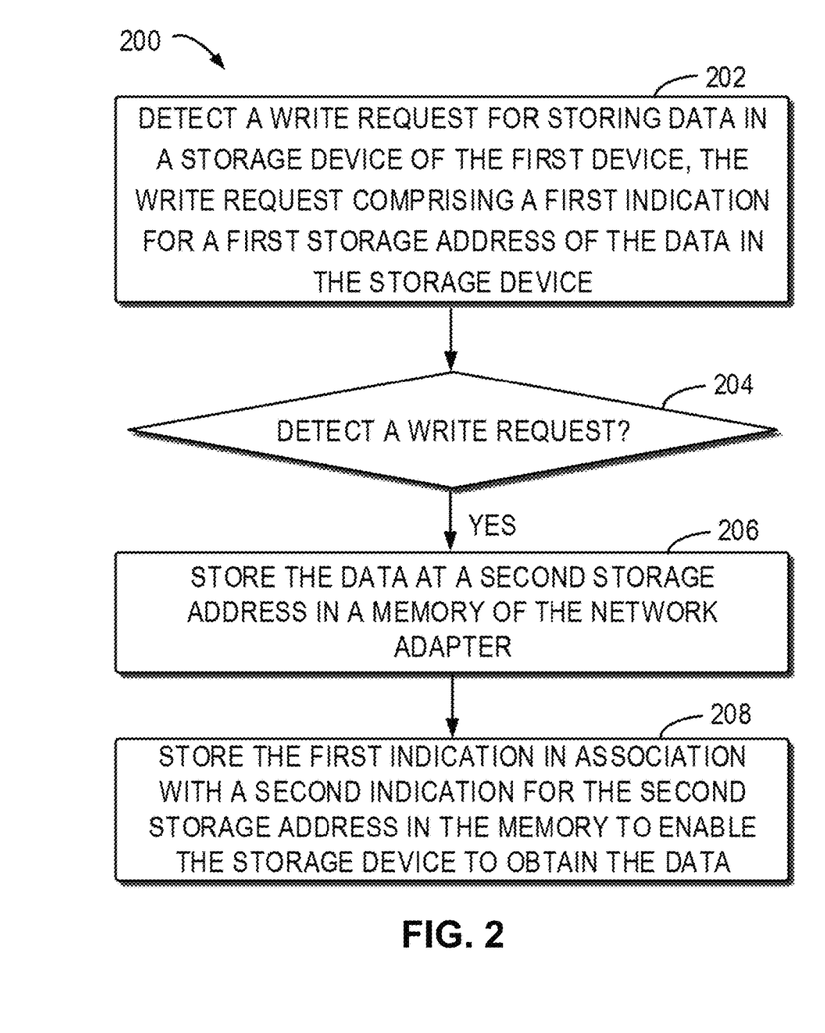
FIG. 2 illustrates a flowchart of a method for writing data according to an embodiment of the present disclosure.

FIG. 2 illustrates a flowchart of the method 200 of writing data according to an embodiment of the present disclosure. The method 200 may be performed by the network adapter 106 of the first device 102 as shown in FIG. 1, and may also be performed by another appropriate device.

The method 200 starts from block 202, in which the network adapter 106 detects a write request for storing data to the storage device 108 of the first device 102. The write request includes a first indication for a first storage address of the data in the storage device 108, i.e., the write request provides a storage address where data are to be stored. The write request is sent from the second device 104.

In some embodiments, there is a queue for storing received commands in the memory 112 of the first device 102. In some embodiments, the queue storing the received commands is a receive queue of an NVMf queue pair (QP). The network adapter 106 detects, by monitoring whether there is a command in the queue, whether a write request is received. In some embodiments, the network adapter 106 determines, by polling, whether a write request is received. In some other embodiments, the network adapter 106 determines, in an interrupted way, whether a write request is received. The above example is provided only for describing the present disclosure, rather than specifically limiting the scope of the present disclosure.

At block 204, the network adapter 106 determines whether a write request is detected. If a write request is detected, then at block 206, the data are stored in the memory 112 of the network adapter 106, and a storage address of the data in the memory 112 is hereinafter referred to as a second storage address. The memory 112 in the network adapter 106 is provided for storing data in the storage device 108 in the first device 102.

In some embodiments, upon receiving the write request, the network adapter 106 will allocate, in the memory 122, a storage space for data to be stored. For example, a data buffer area is provided in the memory 112. In some embodiments, the write request includes a length of the data to be stored. Therefore, an appropriate storage space may be allocated for the data based on the length of the data to be stored. Alternatively or additionally, a storage address associated with the storage space may be determined. The above example is provided only for describing the present disclosure, rather than specifically limiting the scope of the present disclosure. The memory 112 of the network adapter 106 may be provided with a storage space for storing data through any appropriate method.

In some embodiments, the write request includes a third storage address of the data in the memory of the second device 104. Upon receiving the write request, the network adapter 106 obtains a third storage address from the write request. The network adapter 106 obtains the data from the second device 104 based on the third storage address, and then stores the obtained data in the memory 112 of the network adapter 106.

In some embodiments, the network adapter 106 generates a command for reading data from the second device 104. Alternatively or additionally, the network adapter 106 stores the generated command in a send queue of the NVMf queue pair QP. Alternatively or additionally, through a remote direct memory access RDMA operation, the network adapter 106 obtains, from the second device 104, the data to be written. Alternatively or additionally, when obtaining data from the second device 104, a length of the data to be written is also required. The above example is provided only for describing the present disclosure, rather than specifically limiting the scope of the present disclosure. The data to be written may be obtained from the second device 104 by adopting any appropriate manner.

At block 208, the network adapter 106 stores the first indication in association with the second indication for the second storage address in the memory 112 to enable the storage device 108 to obtain data.

In some embodiments, the first storage address determined from the write request may be stored in association with the second address for the data in the memory 112. In some embodiments, the first and second addresses form a command which is stored in a send queue in the memory 112 and may be accessed by the storage device 108 via a direct memory access operation. Alternatively or additionally, the queue is a send queue for the NVMe. In some other embodiments, data items including the first and second addresses are stored in the memory 112. The data items may be obtained by the storage device 108. The above example is provided only for describing the present disclosure, rather than specifically limiting the scope of the present disclosure. The first and the second addresses may be stored in any appropriate manner.

In some embodiments, after the first and second addresses are stored in the memory 112, a trigger message may be sent to the storage device 108 such that the storage device 108 obtains the first and second storage addresses from the memory 112. In some embodiments, immediately after the first and second storage addresses are stored, a trigger message is sent to the storage device 108. In some other embodiments, after the first and second addresses are stored, it is determined whether data items related to the first and second storage addresses reach a predetermined number, and if the predetermined number is reached, then the trigger message is sent to the storage device 108. In some embodiments, the trigger message is a doorbell indication. The above example is provided only for describing the present disclosure, rather than specifically limiting the scope of the present disclosure, and the trigger message may be sent under any appropriate condition.

In some embodiments, upon receiving the trigger message, the storage device 108 may perform, via a controller of the storage device 108, a direct memory access operation on the memory 112 of the network adapter 106. First, the storage device 108 reads information including the first indication for the first storage address and the second indication for the second storage address stored in the memory 112. The storage device 108 analyzes the read command, and then reads, from the memory 112 of the network adapter 106, the data written into the storage space associated with the second storage address, via the direct memory access operation, based on the first and second storage addresses. The read data are stored in the first storage address of the storage device 108. As such, storing data in the storage device 108 is implemented.

In some embodiments, the network adapter 106 and the storage device 108 are connected via a peripheral component interconnect extend (PCIe) exchanger. Alternatively or additionally, the network adapter 106 and the memory 108 may implement a peer to peer communication. In some embodiments, prior to the peer to peer transmission, the network adapter 106 and the storage device 108 are configured by running a drive in the first device to notify each other for the peer to peer communication. When the network adapter 106 and the storage device 108 are performing the peer to peer communication via the PCIe exchanger, it is not required to exchange commands and data between the processor and memory of the first device 102 and the PCIe exchanger.

The written data being directly stored into the storage device 108 is implemented via the controller 110 and the memory 112 of the network adapter 106, without a need of using a processor and memory of the first device, thereby reducing a waste of the processor and memory of the computing device and decreasing latency in processing commands received by the processor. In addition, since the commands and data are not sent, via an upstream port of a PCIe exchanger, to the processor and the memory of the first device, a waste of the upstream bandwidth of the PCIe exchanger is decreased.

Figure 3:
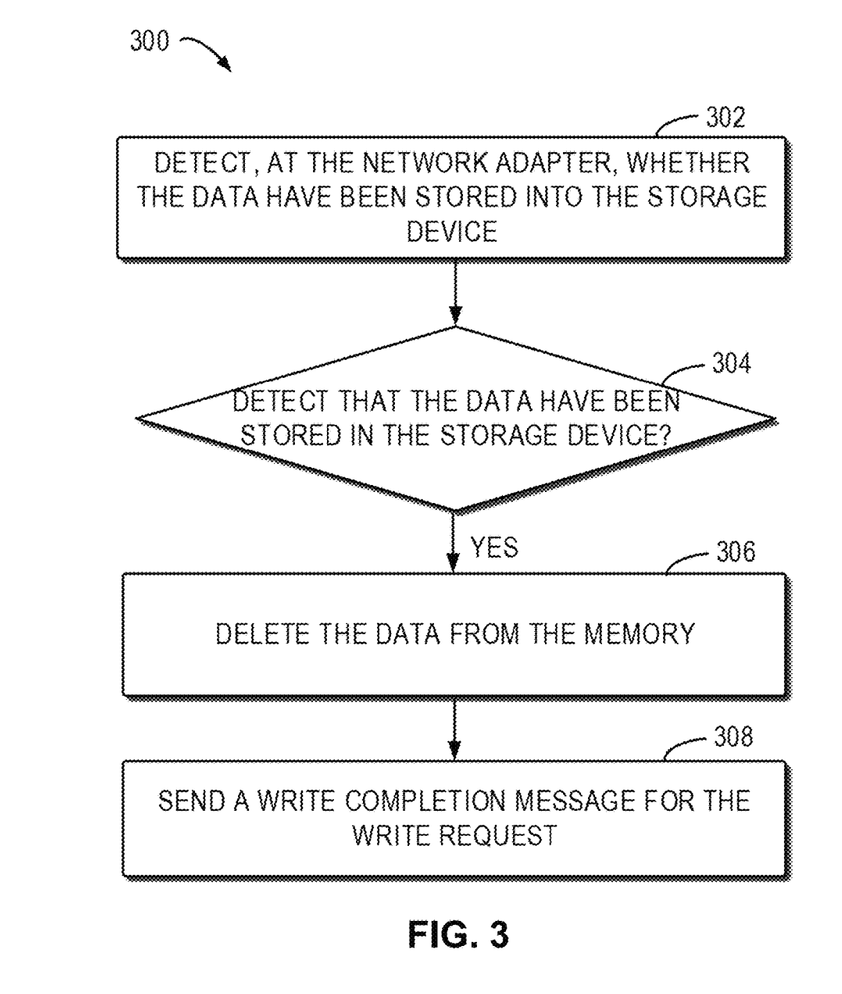
FIG. 3 illustrates a flowchart of a method of sending a write completion message according to an embodiment of the present disclosure.

The flowchart of the method 200 of writing data according to an embodiment of the present disclosure has been described above with reference to FIG. 2. A flowchart of a method 300 of sending a write completion message according to an embodiment of the present disclosure will be detailed below.

FIG. 3 illustrates a flowchart of the method 300 of sending the write completion message according to an embodiment of the present disclosure. The method 300 may be performed by the network adapter 106 of the first device as shown in FIG. 1, or may also be performed by another appropriate device.

The method 300 starts from block 302, in which the network adapter 106 detects whether data have been stored in the storage device 108. In some embodiments, after storing data from a second storage address to a first storage address of a storage device 108, the storage device 108 writes a write completion command within the memory 112 of the network adapter 106. The network adapter 106 determines, by determining whether the completion command is detected in the memory 112, whether the data are stored in the storage device 108. In some embodiments, the completion command is written into a completion queue within the memory 112. Alternatively or additionally, the queue is a completion queue for the NVMe. Alternatively or additionally, the network adapter 106 detects, by a polling or an interruption, whether there is a completion command in the completion queue. The above example is provided only for describing the present disclosure, rather than specifically limiting the scope of the present disclosure.

In block 304, the network adapter 106 determines whether it is detected that the data have been stored in the storage device 108. If it is detected that the data has been stored in the storage device 108, at block 306, the data in the memory 112 are deleted. In some embodiments, deleting the data is implemented by releasing the allocated storage space. In some other embodiments, deleting the data is implemented by marking the storage space storing data as an unused space. The above example is provided only for describing the present disclosure, rather than specifically limiting the scope of the present disclosure. The data stored in the memory 112 may be deleted in any appropriate manner.

At block 308, the network adapter 106 sends a write completion message for the write request. In some embodiments, the write completion message is first placed in a send queue of a queue pair, and then sent. The above example is provided only for describing the present disclosure, rather than specifically limiting the scope of the present disclosure.

By only monitoring whether the storage device writes a completion command into the memory of the network adapter, without controlling data write via a controller of the network adapter, a waste of the controller of the network adapter may be reduced and an utilization of the controller of the network storage device is improved.

The flowchart of the method 300 of sending the write completion message has been described above with reference to FIG. 3, and a flowchart of a method 400 of reading data will be described below with reference to FIG. 4.

Figure 4:
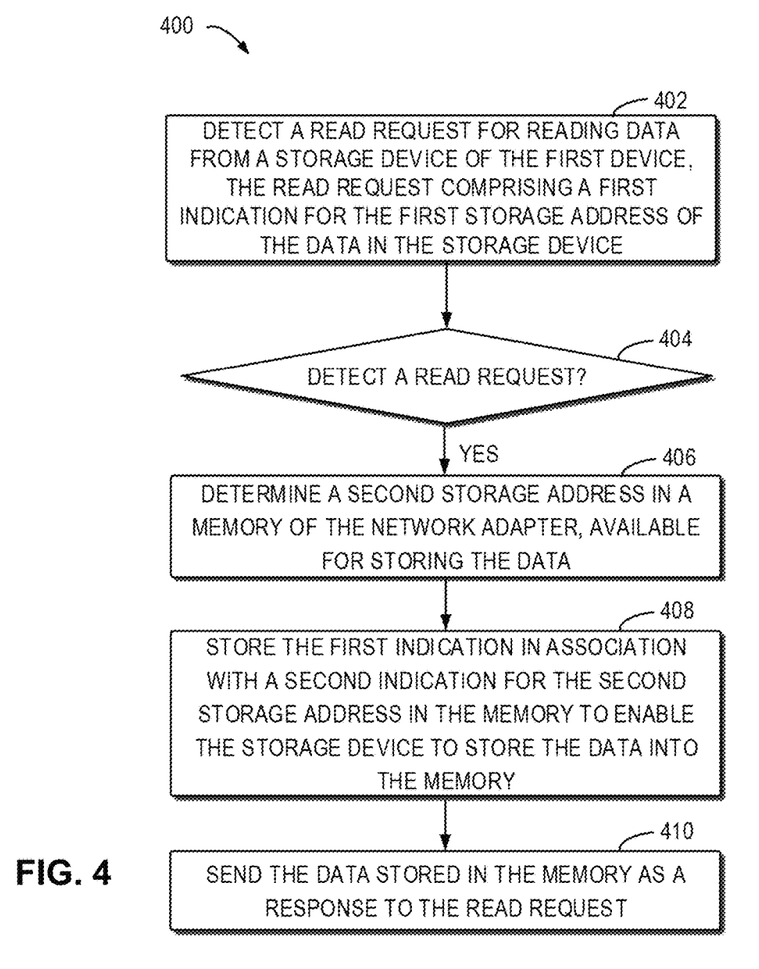
FIG. 4 illustrates a flowchart of a method of reading data according to an embodiment of the present disclosure.

FIG. 4 illustrates a flowchart of the method 400 of reading data according to an embodiment of the present disclosure. The method 400 may be performed by the network adapter 106 of the first device 102 as shown in FIG. 1, or may be performed by other appropriate devices.

The method 400 starts from block 402, in which the network adapter 106 detects a read request for reading data for the storage device 108 of the first device 102. The read request includes a first indication for a first storage address of the data in the storage device 108. The read request is sent by the second device 104 connected with the first device 102.

In some embodiments, the read request further includes a length of data to be read. Alternatively or additionally, the read request further includes a storage address of the memory of the second device 104 sending the read request where the data are to be stored. The above example is provided only for describing the present disclosure, rather than specifically limiting the scope of the present disclosure. The read request may include any appropriate information.

In some embodiments, there is a queue for storing received commands in the storage device 108 of the first device 102. In some embodiments, the queue of received commands is a receive queue of the NVMf queue pair QP. The network adapter 106 detects, by monitoring whether there is a command in the queue, whether a read request is received. In some embodiments, the network adapter 106 determines, by polling, whether a read request is received. In some other embodiments, the network adapter 106 determines, in an interrupting manner, whether a read request is received. The above example is provided only for describing the present disclosure, rather than specifically limiting the scope of the present disclosure.

At block 404, the network adapter 106 determines whether a read request is detected. If a read request is detected, at block 406, a second storage address in the memory 112 of the network adapter, available for storing the data to be read is determined. The memory 112 in the network adapter 106 is provided for storing data read from the storage device 108 of the first device 102. In some embodiments, upon receiving the read request, the network adapter 106 will allocate, in the memory 112, a storage space for the data to be read. For example, a data buffer area is provided in the memory 112. In the some embodiments, the read request includes a length of data to be stored. Therefore, an appropriate storage space may be allocated for the data based on the length of the data to be stored. Alternatively or additionally, a storage address associated with the storage space may be determined. The above example is provided only for describing the present disclosure, rather than specifically limiting the scope of the present disclosure. Through any appropriate method, the memory 112 of the network adapter 106 may be provided therein with a storage space for storing data.

At block 408, the network adapter 106 stores the first indication in association with a second indication for the second storage address to enable the storage device 108 to store the data into the memory 112.

In some embodiments, the first storage address determined from the read request may be stored, in the memory 112, in association with the second address of the storage space for storing data allocated from the memory 112 of the network adapter 106. In some embodiments, the first and second addresses form a command, and then are stored in a send queue directed to the storage device 108 to be read by the storage device 108. Alternatively or additionally, the queue is a send queue for the NVMe. In some other embodiments, data items including the first and second addresses are stored in the memory 112. The above example is provided only for describing the present disclosure, rather than specifically limiting the scope of the present disclosure. Any appropriate manner may be employed for storing the first and second addresses.

In some embodiments, after the first and second addresses are stored in the memory 112, a trigger message may be sent to the storage device 108 such that the storage device 108 may obtain the first and second storage addresses from the memory 112. In some embodiments, immediately after the first and second addresses are stored, a trigger message is sent to the storage device 108. In some other embodiments, after the first and second addresses are stored, it is determined whether data items related to the first and second addresses reach a predetermined number, and if the predetermined number is reached, a trigger message is sent to the storage device 108. In some embodiments, the trigger message is a doorbell indication. The above example is provided only for describing the present disclosure, rather than specifically limiting the scope of the present disclosure, and the trigger message may be sent under any appropriate condition.

Upon receiving the trigger message, the storage device 108 may perform, via the controller thereof, a direct memory access operation on the memory 112 of the network adapter 106. First, the storage device 108 reads information including the first indication for the first storage address and the second indication for the second storage address stored within the memory 112. The storage device 108 analyzes the read information, and then stores, via a direct memory access operation, the data stored at the first storage address of the memory device 108 to the second storage address of the memory 112 of the network adapter 106, based on the first and second storage addresses.

At block 410, subsequent to determining that the data to be read are stored in the memory 112, the network adapter 106 sends, to the second device 104, the data stored in the memory 112 as a response to the read request. In some embodiments, the network adapter 106 first sends, to the second device 104, the data stored in the memory 112. In one embodiment, the network adapter 106 writes, by remote direct memory access, the data to the memory of the second device 104. After the data are sent successfully to the second device 104, a completion response for the read request is sent to the second device 104. If data transmission is not successful, then the completion response is not sent so that the data are retransmitted to ensure that data are sent successfully to the second device 104.

The read data are sent to the second device 104 via the controller 110 and the memory 112 of the network adapter 106, without using the processor and the memory of the first device 102. The waste of the processor and the memory of the first device is reduced and latency in processing the received commands is decreased.

When sending data stored in the memory 112, it is detected, at the network adapter 106, whether the data have been stored in the memory 112. After storing data from the first storage address of the storage device 108 to the memory 112 of the network adapter 106, the storage device 108 will write a completion command into the memory 112 of the network adapter 106. In some embodiments, the completion command is written into a completion queue. Alternatively or additionally, the queue is a completion queue for the NVMe. The above example is provided only for describing the present disclosure, rather than specifically limiting the scope of the present disclosure.

If the data have been stored into the memory 112, then the network adapter 106 will obtain, from the read request, a third storage address of data in the memory of the second device 104, wherein the read request is sent from the second device 104. Then, the controller 110 stores the data to the third storage address and deletes the data in the memory 112.

In some embodiments, deleting the data is implemented by releasing the allocated storage space. In some other embodiments, deleting the data is implemented by marking the storage space storing data as an unused space. In some further embodiments, a read completion message for the read request is further sent. Alternatively or additionally, the read completion message is first placed in a send queue of a queue pair, and then sent. The above example is provided only for describing the present disclosure, rather than specifically limiting the scope of the present disclosure. In any appropriate manner, the data stored in the memory 112 may be deleted and the read complete message may be sent to the second device 104 having sent the read request.

By only monitoring whether the storage device writes a completion command into the memory of the network adapter, without controlling data write via a controller of the network adapter, a waste of the controller of the network adapter is reduced and a utilization of the controller of the network storage device is improved.

Figure 5:
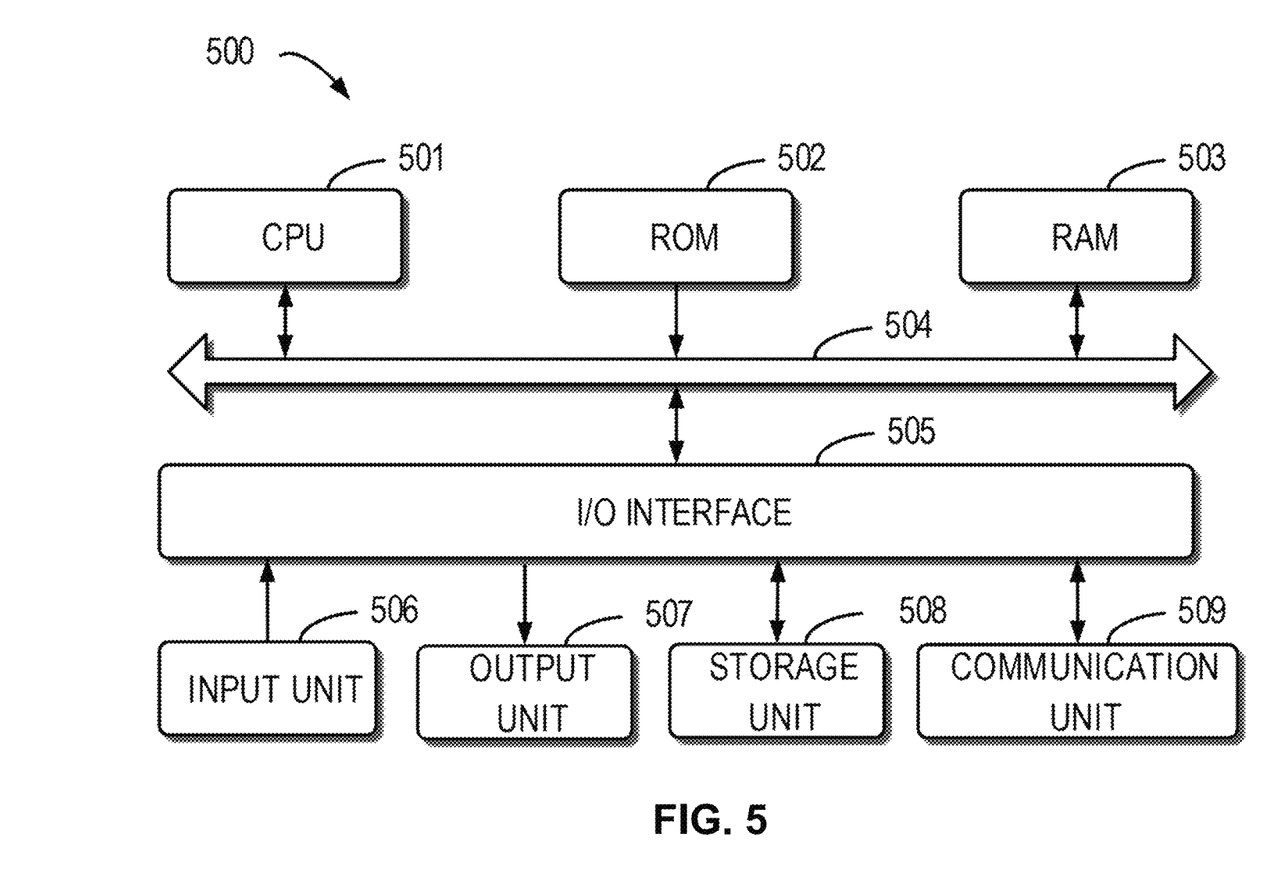
FIG. 5 illustrates a schematic diagram of an example device adapted to implement an embodiment of the present disclosure.

FIG. 5 illustrates a schematic diagram of an example device 500 that can be used to implement embodiments of the present disclosure. For example, any one of 102, 104, 106, 108, 110 and 112 as shown in FIG. 1 can be implemented by a device 500. As shown, the device 500 includes a central processing unit (CPU) 501 that can perform various appropriate acts and processing based on computer program instructions stored in a read-only memory (ROM) 502 or computer program instructions loaded from a storage unit 508 to a random access memory (RAM) 503. RAM 503 stores various programs and data needed for operations of the device 500. The CPU 501, ROM 502 and RAM 503 are connected to each other via a bus 504. An input/output (I/O) interface 505 is also connected to the bus 504.

The following components in the device 500 are connected to the I/O interface 505: an input unit 506, such as a keyboard, a mouse and the like; an output unit 507, such as various kinds of displays and a loudspeaker, etc.; a storage unit 508, such as a magnetic disk, an optical disk, and etc.; a communication unit 509, such as a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the methods 200, 300 and 400, can be executed by the processing unit 501. For example, in some embodiments, the methods 200, 300 and 400 may be implemented as a computer software program that is tangibly embodied on a machine readable medium, e.g., the storage unit 508. In some embodiments, a part or all of the computer programs may be loaded and/or mounted onto the device 500 via the ROM 502 and/or the communication unit 509. When the computer program is loaded to the RAM 503 and executed by the CPU 501, one or more acts of the methods 200, 300 and 400 as described above can be executed.

The present disclosure can be a method, a device, a system and/or a computer program product. The computer program product can include a computer readable storage medium on which computer readable program instructions are carried out for performing each aspect of the present application.

The computer readable medium may be a tangible medium that may contain and store instructions for use by an instruction execution device. The computer readable storage medium, for example, may be, but not limited to, an electronic, magnetic, optical, electromagnetic, semiconductor device, or any suitable combination of the foregoing. More specific examples (a non-exhaustive list) of the machine readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or a server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, an electronic circuitry including, for example, a programmable logic circuitry, a field-programmable gate arrays (FPGA), or a programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processing unit of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored thereon includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate an architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain principles of the embodiments, a practical application or technical improvement over technologies found in marketplace, or to enable others of ordinary skill in the art to understand the embodiments disclosed herein.

What is claimed is:

1. A method of writing data, comprising:
at a network adapter of a first device,
   detecting a write request for storing data in a storage device of the first device, the write request comprising a first indication for a first storage address of the data in the storage device;
   in response to detecting the write request, storing the data at a second storage address in a memory of the network adapter; and
   storing the first indication in association with a second indication for the second storage address in the memory to enable the storage device to obtain the data;
   wherein storing the first indication in association with the second indication for the second storage address comprises:
   responsive to the data related to the first storage address and the second storage address being at a predetermined number, sending a trigger message to the storage device to enable the storage device to obtain from the memory the first storage address and the second storage address and store the data from the second storage address to the first storage address.

2. The method of claim 1, wherein storing the data at the second storage address in the memory of the network adapter comprises:
   determining, from the write request, a third storage address of the data in a memory of a second device, the write request being sent by the second device;
   obtaining the data from the second device based on the third storage address; and
   storing the data to the second storage address.

3. The method of claim 1, wherein the data are stored to the first storage address by the storage device performing a direct memory access operation on the memory.

4. The method of claim 1, further comprising:
   detecting, at the network adapter, whether the data have been stored into the storage device; and
   in response to detecting that the data have been stored into the storage device,
      deleting the data from the memory, and
      sending a write completion message for the write request.

5. The method of claim 1, wherein detecting a write request for storing data in a storage device of the first device comprises monitoring a queue for receipt of a command; and responsive to the queue receiving a command, detecting the write request.

6. A computer program product being tangibly stored on a non-volatile computer readable medium and comprising machine executable instructions which, when executed, causing a machine to perform steps of the method of claim 1.

7. A network adapter, comprising:
   a processor; and
   a memory coupled to the processor and having instructions stored thereon which, when executed by the processor, causing the network adapter to perform acts comprising:
      detecting a write request for storing data in a storage device of a first device, the write request comprising a first indication for a first storage address of the data in the storage device;
      in response to detecting the write request, storing the data at a second storage address in the memory of the network adapter; and
      storing the first indication in association with a second indication for the second storage address in the memory to enable the storage device to obtain the data;
      wherein storing the first indication in association with the second indication for the second storage address comprises:
      responsive to the data related to the first storage address and the second storage address being at a predetermined number, sending a trigger message to the storage device to enable the storage device to obtain from the memory the first storage address and the second storage address and store the data from the second storage address to the first storage address.

8. The network adapter of claim 7, wherein storing the data at the second storage address in the memory of the network adapter comprises:
   determining, from the write request, a third storage address of the data in a memory of a second device, the write request being sent by the second device;
   obtaining the data from the second device based on the third storage address; and
   storing the data to the second storage address.

9. The network adapter of claim 7, wherein the data are stored to the first storage address by the storage device performing a direct memory access operation on the memory.

10. The network adapter of claim 7, the acts further comprises:
   detecting, at the network adapter, whether the data have been stored into the storage device; and
   in response to detecting that the data have been stored into the storage device,
      deleting the data from the memory, and
      sending a write completion message for the write request.

11. The network adapter of claim 7, wherein detecting a write request for storing data in a storage device of the first device comprises monitoring a queue for receipt of a command; and responsive to the queue receiving a command, detecting the write request.

12. A method of reading data, comprising:
at a network adapter of a first device, detecting a read request for reading data from a storage device of the first device, the read request comprising a first indication for a first storage address of the data in the storage device;

in response to detecting the read request, determining a second storage address, in a memory of the network adapter, available for storing the data;

storing the first indication in association with a second indication for the second storage address in the memory, to enable the storage device to store the data into the memory; and sending the data stored in the memory as a response to the read request;

wherein storing the first indication in association with the second indication for the second storage address comprises:

responsive to the data related to the first storage address and the second storage address being at a predetermined number, sending a trigger message to the storage device to enable the storage device to obtain from the memory the first storage address and the second storage address and store the data from the second storage address to the first storage address.

13. The method of claim 12, wherein the data are stored to the second storage address by the storage device performing a direction memory access operation on the memory.

14. The method of claim 12, wherein sending the data stored in the memory comprises:

detecting, at the network adapter, whether the data have been stored into the memory; and in response to detecting that the data have been stored into the memory,
  obtaining, from the read request, a third storage address of the data in a memory of a second device, the read request being sent by the second device,
  storing the data to the third storage address, and
  deleting the data from the memory.

15. The method of claim 12, wherein detecting a read request for storing data in a storage device of the first device comprises monitoring a queue for receipt of a command; and responsive to the queue receiving a command, detecting the read request.

16. A computer program product being tangibly stored on a nonvolatile computer readable medium and comprising machine executable instructions which, when executed, causing a machine to perform steps of the method of claim 12.

17. A network adapter, comprising:

a processor; and a memory coupled to the processor and having instructions stored thereon which, when executed by the processor, causing the network adapter to perform the steps of claim 12;

wherein storing the first indication in association with the second indication for the second storage address in the memory comprises:

responsive to the data related to the first storage address and the second storage address being at a predetermined number, sending a trigger message to the storage device to enable the storage device to obtain from the memory the first storage address and the second storage address and store the data from the second storage address to the first storage address.

18. The network adapter of claim 17, wherein the data are stored to the second storage address by the storage device performing a direct memory access operation on the memory.

19. The network adapter of claim 17, wherein sending the data stored in the memory comprises:

detecting, at the network adapter, whether the data have been stored into the memory; and in response to detecting that the data have been stored into the memory,
  obtaining, from the read request, a third storage address of the data in a memory of a second device, the read request being sent by the second device,
  storing the data to the third storage address, and
  deleting the data from the memory.

20. The network adapter of claim 17, wherein detecting a read request for storing data in a storage device of the first device comprises monitoring a queue for receipt of a command; and responsive to the queue receiving a command, detecting the read request.

* * * * *